United States Patent [19]

Brittingham

[11] 4,176,416
[45] Dec. 4, 1979

[54] BEE FRAME CADDY

[76] Inventor: William C. Brittingham, 199 Finnegan's La., North Brunswick, N.J. 08902

[21] Appl. No.: 836,298

[22] Filed: Sep. 26, 1977

[51] Int. Cl.² .............................................. A01K 51/00
[52] U.S. Cl. ...................................... 6/12 R; 211/189
[58] Field of Search .................. 6/10, 11, 12 M, 12 R; 144/287, 288 C; 269/296, 321 E; 211/11, 46, 94, 162, 169.1, 170, 189, 191, 201, 204

[56] References Cited

U.S. PATENT DOCUMENTS 1,518,077  12/1924  Kouba ..................................... 6/12 R

FOREIGN PATENT DOCUMENTS 919565  10/1954  Fed. Rep. of Germany ................ 6/10

Primary Examiner—Russell R. Kinsey
Assistant Examiner—Robert P. Swiatek
Attorney, Agent, or Firm—Abraham Wilson

[57] ABSTRACT

There is described a bee frame caddy useful in supporting, storing, manipulating or inspecting bee frames, which may be laden with brood and honey, thereby facilitating various beekeeping operations. The caddy comprises a holding rack, having a rectangular opening, the rack being dimensioned to receive bee frames and to permit the frames to hang within the rectangular opening; at least one upright inspection support having an upper end and a lower end, the upper end having an opening dimensioned to receive a bee frame and to permit the frame to hang within the opening, the lower end of the inspection support being affixed in a substantially perpendicular fashion to the holding rack.

9 Claims, 3 Drawing Figures

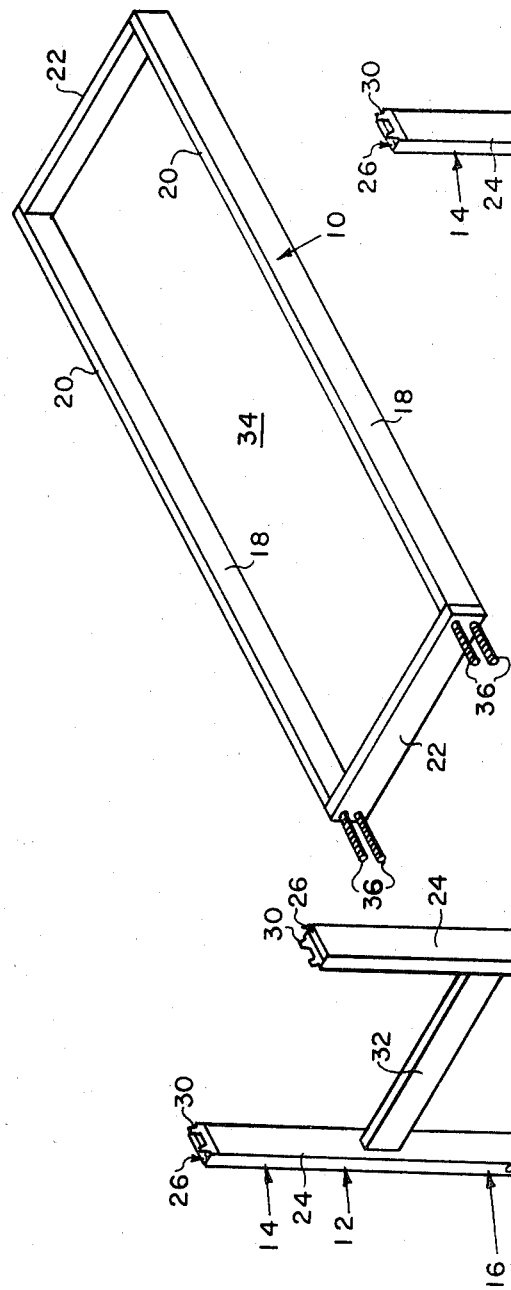
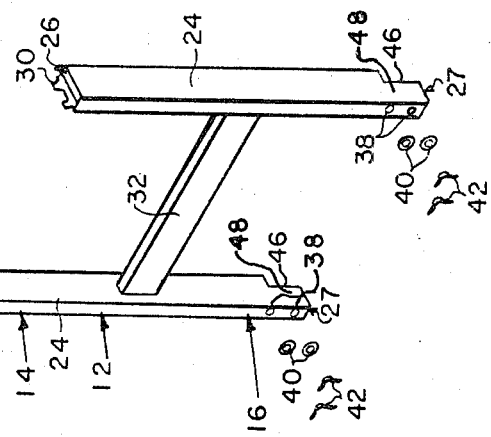

BEE FRAME CADDY

FIELD OF INVENTION

This invention relates to the art of beekeeping. More particularly the invention relates to a novel bee frame caddy, having a holding rack which supports and stores bee frames, and at least one upright inspection support affixed in a substantially perpendicular fashion to the holding rack, which inspection support permits and facilitates the individual inspection or manipulation of said bee frames.

DESCRIPTION OF PRIOR ART

A typical beehive embodies a number of bee frames (which may have various depths) and at least one outer hive body or box for supporting the frames in vertical side by side relation. Each bee frame has four frame bars joined end to end forming a central rectangular opening. Supported within this opening is a sheet referred to as a comb foundation or simply a foundation, typically having hexagonal cellular formations which simulate the cells of a honeycomb. This foundation is generally made with beeswax and forms a base on which bees construct honeycombs to be filled with honey or to serve as brood cells. Projecting from the ends of the bee frame along the axis of the top frame bar are ears which are adapted to engage supports on two opposing walls of the hive body or box. For convenience of description, the bee frame and foundation are collectively referred to in this disclosure as a bee frame, unless otherwise stated.

In the art of beekeeping, various operations and manipulations involving the bee frames, (which may be laden with brood and/or honey), are necessary for proper maintenance of the beehive and for efficient production of honey. Such operations and manipulations include, for example, sorting the bee frames containing honey, eggs, larva and capped brood, to permit a more desired or efficient assembly or reassembly of the hive; inspecting bee frames laden with brood and honey for eggs, larva and disease; and searching for the queen bee. Most commonly, in carrying out such operations and manipulations it is the practice to prop the bee frames laden with brood and honey, against various objects, as for example, trees and buildings. Such practice is usually harmful to the bees, killing many, and tends to make sorting and inspecting the frames and achieving the desired organization thereof in the hive difficult tasks. Further, it is sometimes the practice to employ extra hive boxes or bodies to aid in the sorting operation and to store the bee frames. This can involve providing extra hive bodies of various depths to accommodate the bee frames involved.

SUMMARY OF THE INVENTION

It is a primary object of this invention to provide a device which facilitates the various beekeeping operations involving the sorting, storing, manipulating and inspecting of bee frames, in a manner which additionally protects the bees from harm or injury. Other objects and advantages will become apparent from the following description which is to be taken in conjunction with the accompanying drawing.

The present invention provides a bee frame caddy which has a holding rack having two side bars and two end bars, joined end to end in an open rectangular configuration, defining a central rectangular opening in the rack, said side bars having top surfaces. The rack is dimensioned to receive bee frames and to permit the frames to hang from and be supported by the top surfaces of the side bars. The caddy further has at least one upright inspection support having an upper end and a lower end and comprising at least two substantially parallel upright bars having top surfaces and bottom surfaces and at least one cross bar attached to and joining the upright bars. The upper end of the inspection support has an opening dimensioned to receive a bee frame and to permit the frame to hang from and be supported by the top surfaces of the upright bars. The upright inspection support is affixed in a substantially perpendicular fashion to the holding rack.

The bee frame caddy may be fabricated from any suitable material as for example wood, metal and plastic. Wood, however, is the most preferred material since it is economical and, being a poorer conductor of heat than, for example, metal, is more desirable for use in warm or hot weather, thus avoiding discomfort to both bees and beekeeper as might be caused by their contacting a hot metal object.

The holding rack and upright inspection support may be affixed by manufacture in a molded unitary fashion. It is more practical, and therefore preferred that the holding rack and inspection support are affixed after separate manufacture. In the most preferred embodiment of the invention, said rack and said support are detachably affixed, thereby facilitating storage and/or transportation of the bee frame caddy.

The length of the holding rack, along the axis of the side bars, is not critical. When portability and facility of storage are desired characteristics of the bee frame caddy, holding rack lengths on the order of from about 48 inches to about 54 inches have been found to be particularly suitable. Typically, a rack of this length will store and support on the order of twenty bee frames. The inside width of the holding rack, along the axis of the end bars, should be as to permit a bee frame to be inserted between the side bars of the holding rack. The bee frame ears projecting from the ends of the bee frame, along the axis of the top bee frame bar are engaged by the top surfaces of the side bars of the holding rack. When the bee frame caddy is to be used in connection with standard bee frames having a width of about $17\frac{5}{8}$ inches, inside widths of the holding rack on the order of from about 18 inches to about $18\frac{1}{4}$ inches have been found satisfactory.

The length of the upright inspection support along the axis of the upright bars is not critical. Typically, lengths on the order of from about 28 inches to about 30 inches are satisfactory, however, shorter or longer lengths may be used when desired. Similar to the holding rack, the inside width of the upright inspection support, along an axis perpendicular to the upright bars, should be as to permit a bee frame to be inserted between said upright bars. Preferably, the inside widths of the holding rack and the upright inspection support are substantially the same. The bee frame is supported by the top surfaces of the upright bars which engage the bee frame ears.

Preferably, there is provided means for deterring a bee frame from slipping off or falling off the top surfaces of the upright bars. Such means include for example notches in, or lips (stops) extending above said top surfaces of the upright bars. When top surfaces having notches are employed, said notches are disposed and dimensioned to engage a bee frame, by means of the frame ears, thereby more securely supporting the bee frame. When lips or stops extending above the top surfaces are employed, there are at least two lips or stops affixed to each upright bar, said lips or stops being disposed and dimensioned to contain the frame ears on the top surfaces of said upright bars thereby deterring the bee frame from slipping off or falling off said top surfaces. In another and more preferred embodiment of the invention, at least two notched extensions as for example metal rabbets, are affixed to the upright bars, on an axis along the length of said bars, so as to vertically extend above the top surfaces of the upright bars. The notched extensions are disposed and dimensioned to engage a bee frame (by means of the bee frame ears) which hangs from and is supported by said notched extensions. This embodiment of the invention has been found to facilitate certain manipulations of the bee frame, as for example removal of the bee frame from the upright inspection support, while wearing bee gloves.

A cross bar, affixed to the upright bars is provided for stability. The positioning of the cross bar is not critical, although it is preferably affixed to the upright bars at or near a point equidistant from the ends of said upright bars. Preferably, but not necessarily, the cross bar is perpendicularly disposed relative to the upright bars. A plurality of cross bars may be employed when for example it is desired to increase the stability of the inspection support.

Preferably there is one upright inspection support, although more than one may be employed, if desired. The inspection support may be affixed to a side bar but is preferably affixed to an end bar. In the most preferred embodiment of the invention, the upright inspection support is detachably affixed to the holding rack. This may be accomplished for example by affixing a plurality of bolts to an end bar of the holding rack, extending in an outward direction from said holding rack on an axis along the length of the side bars. The bolts are positioned to engage holes in the upright bars at the lower end of the upright inspection support, said holes being disposed and dimensioned to telescope the bolts which are of sufficient length to permit the application thereto of washers and nuts upon insertion of said bolts through said holes. The holding rack and upright inspection support are detachably affixed by inserting the hanger bolts through said holes and applying washers and nuts to the portions of said bolts extending beyond said holes.

A preferred upright inspection support has substantially right angled notches in the upright bars at the lower end of the inspection support, resulting in narrowed portions and notched inner surfaces of the upright bars. The notches are formed along a line extending up from the bottom surfaces of the upright bars, (on an axis along the length of the upright bars), and a line extending substantially perpendicular to the upright bars. The narrowed portions have holes as described above to telescope bolts affixed to the holding rack. The upright inspection support and holding rack are affixed by means of bolts, washers and nuts as described above, with said right angled notches substantially contacting the holding rack thereby increasing the stability of the bee frame caddy.

Although legs could be affixed to the bee frame caddy, the caddy is made preferably without legs affixed, being set upon any convenient support, as for example saw horses. In this way, the bee frame caddy can more easily accommodate the height of the operator and the angle of the ground where the caddy is to be used. Further, the absence of affixed legs makes the bee frame caddy more easily stored and transported.

BRIEF DESCRIPTION OF DRAWING

In the accompanying drawings forming a part of this application and in which like numerals are employed to designate like parts throughout the same.

FIG. 2 is a exploded perspective view of another embodiment of the invention wherein the holding rack and upright inspection support are detachably affixed.

FIG. 3 is a perspective view of the upright inspection support showing right angled notches.

DETAILED DESCRIPTION OF THE INVENTION

Figure 1:
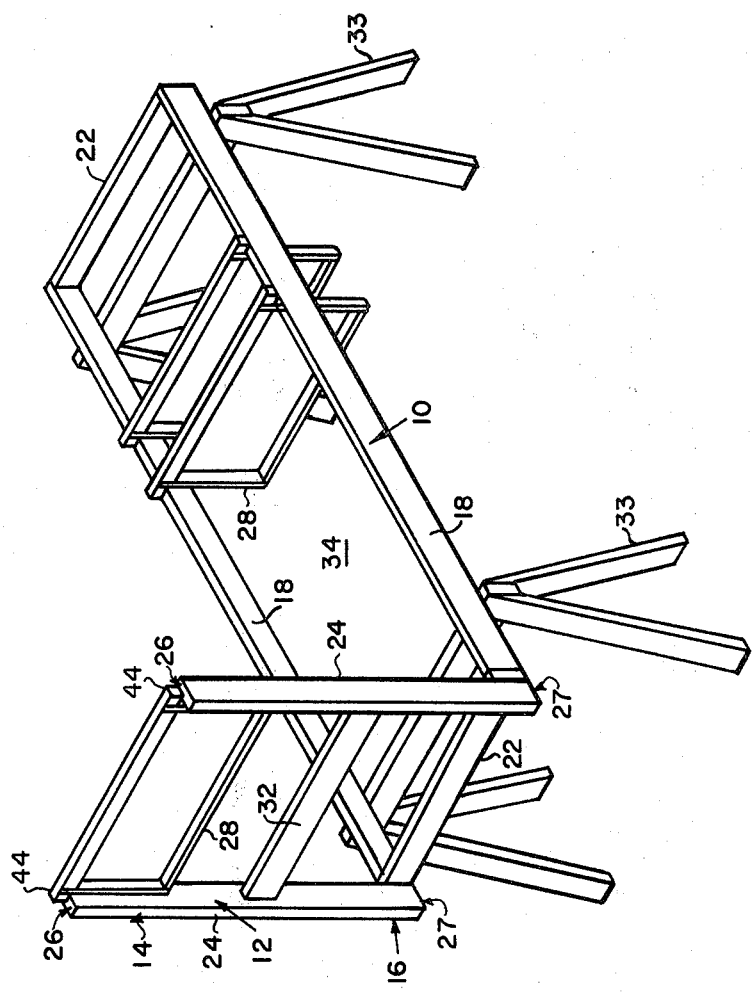
FIG. 1 is a perspective view of a bee frame caddy according to the invention.

In the drawings wherein for the purpose of illustration are shown preferred embodiments of the invention, attention being directed first to FIG. 1, the numeral 10 designates the holding rack as a whole. The holding rack 10 has two side bars 18, 18, and two end bars 22, 22, which are joined end to end in a open rectangular configuration, defining a central rectangular opening 34 in the holding rack 10. The holding rack 10 is dimensioned to receive bee frames 28, and to permit said frames to hang from and be supported by the top surfaces 20, 20, of the side bars 18, 18, the bee frame ears 44, 44, being engaged by the top surfaces 20, 20.

The numeral 12, designates the upright inspection support as a whole. The upright inspection support 12 has an upper end 14 and a lower end 16 and consists of two substantially parallel upright bars 24, 24, having top surfaces 26, 26, and bottom surfaces 27, 27. The upright bars 24, 24, are interjoined by cross bar 32 which is substantially perpendicular to the upright bars. Preferably as shown, the cross bar 32 is attached to and joins the upright bars 24, 24, at points approximately equidistant from the ends of said upright bars.

The upper end 14 of the upright inspection support 12 has an opening dimensioned to receive a bee frame 28, and to permit said frame to hang from and be supported by the top surfaces 26, 26, of the upright bars 24, 24, and the bee frame ears 44, 44, being engaged by the top surfaces 26, 26. The lower end 16 of the upright inspection support 12 is affixed to the holding rack 10 in a substantially perpendicular fashion, along an end bar 22.

Referring now to FIG. 2, there is illustrated, in an exploded perspective view an embodiment of the invention wherein the holding rack 10 and upright inspection support 12 are detachably affixed. Affixed to an end bar 22 of the holding rack 10 are four hanger bolts 36, 36, 36, 36, extending in an outward direction from said holding rack on an axis along the length of the side bars 18, 18. The hanger bolts 36, 36, 36, 36, are positioned to engage holes 38, 38, 38, 38, in the upright bars 24, 24, at the lower end 16 of the upright inspection support 12, said holes being designed and dimensioned to telescope said hanger bolts. Hanger bolts 36, 36, 36, 36, are of sufficient lengths to permit the application thereto of washers 40, 40, 40, 40, and nuts 42, 42, 42, 42, upon insertion of said bolts through said holes. The holding rack 10 and upright inspection support 12 are detachably affixed by inserting the hanger bolts 36, 36, 36, 36, through the holes 38, 38, 38, 38, and applying washers 40, 40, 40, 40, and nuts 42, 42, 42, 42, to the portions of said bolts extending beyond said holes.

Further referring to FIG. 2, there are illustrated notched extensions 30, 30, which are affixed to the upright bars 24, 24, on an axis along the length of said upright bars, so as to vertically extend above the top surfaces 26, 26, of said upright bars. The notched extensions 30,30, are disposed and dimensioned to engage a bee frame by the bee frame ears, and have been found to provide a particularly safe and convenient means for supporting said frames.

FIG. 3 illustrates a form of the upright bars 24, 24, of the inspection support 12 which have substantially right angled notches 46, 46, resulting in narrowed portions 48, 48. The notches 46, 46, are formed along a line extending up from the bottom surfaces 27, 27, of the upright bars 24, 24, (on an axis along the length of said upright bars), and a line extending substantially perpendicular to the upright bars 24, 24. Affixed to an end bar 22 of the holding rack 10 are four hanger bolts 36, 36, 36, 36, extending in an outward direction from said holding rack, on an axis along the length of the side bars 18, 18. The hanger bolts 36, 36, 36, 36, are positioned to engage holes 38, 38, 38, 38, in the narrowed portions 48, 48, of the upright bars 24, 24. Holes 38, 38, 38, 38, extend through the right angled notches 46, 46, and are disposed and dimensioned to telescope the hanger bolts 36, 36, 36, 36. Said hanger bolts are of sufficient length to permit the application thereto of washers 40, 40, 40, 40, and nuts 42, 42, 42, 42, upon insertion of said bolts through said holes. The holding rack 10 and upright inspection support 12 are detachably affixed by inserting the hanger bolts 36, 36, 36, 36, through the holes 38, 38, 38, 38, and applying washers 40, 40, 40, 40, and nuts 42, 42, 42, 42, to the portions of said bolts extending beyond said holes. In this embodiment of the invention when the holding rack 10 and upright inspection support 12 are detachably affixed, right angled notches 46, 46, substantially contact the holding rack 10, thereby increasing the stability of the bee frame caddy.

When using embodiments of the invention illustrated in FIGS. 1-3 to sort, store and/or inspect bee frames, the bee frame caddy is set upon any convenient support as for example saw horses 33 of FIG. 1. In this way, the bee frame caddy can more easily accommodate the height of the operator and the angle of the ground where the caddy is to be used.

The foregoing is considered as illustrative only of the principals of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A bee frame caddy for extrahive beekeeping operations comprising:
   (a) a holding rack having two side bars and two end bars, joined end to end in an open rectangular configuration, defining a central rectangular opening in said rack, said side bars having top surfaces, said rack being dimensioned to receive bee frames and to permit said frames to hang from and be supported by the top surfaces of said side bars; and
   (b) at least one upright inspection support having an upper end and a lower end and comprising at least two substantially parallel upright bars having top surfaces and bottom surfaces and at least one cross bar attached to and joining said upright bars, said upper end of the inspection support having an opening dimensioned to receive a bee frame and to permit said frame to hang from and be supported by the top surfaces of said upright bars, said upright inspection support being affixed in a substantially perpendicular fashion, to said holding rack.

2. A bee frame caddy according to claim 1 wherein the holding rack and upright inspection support are detachably affixed.

3. A bee frame caddy according to claim 1 wherein at least two of the top surfaces of the upright bars have notches therein, said notches being disposed and dimensioned to engage a bee frame which hangs from and is supported by said top surfaces.

4. A bee frame caddy according to claim 1 further comprising at least two lips affixed to and vertically extending above the top surfaces of each upright bar, said lips being disposed and dimensioned to contain a bee frame on the top surfaces of said upright bars.

5. A bee frame caddy for extrahive beekeeping operations comprising:
   (a) a holding rack having two side bars and two end bars, joined end to end in an open rectangular configuration, defining a central rectangular opening in said rack, said side bars having top surfaces, said rack being dimensioned to receive bee frames and to permit said frames to hang from and be supported by the top surfaces of said side bars; and
   (b) at least one upright inspection support having an upper end and a lower end and comprising at least two substantially parallel upright bars having top surfaces and bottom surfaces and at least one cross bar attached to and joining said upright bars, said upper end of the inspection support having an opening dimensioned to receive a bee frame and to permit said frame to hang from and be supported by the top surfaces of said upright bars, said upright inspection support being detachably affixed in a substantially perpendicular fashion to said holding rack.

6. A bee frame caddy according to claim 5 wherein at least two of the top surfaces of the upright bars have notches therein, said notches being disposed and dimensioned to engage a bee frame which hangs from and is supported by said top surfaces.

7. A bee frame caddy according to claim 5 further comprising at least two lips affixed to and vertically extending above the top surfaces of each upright bar, said lips being disposed and dimensioned to contain a bee frame on the top surfaces of said upright bars.

8. A bee frame caddy for extrahive beekeeping operations comprising:
   (a) a holding rack having two side bars and two end bars, joined end to end in a open rectangular configuration, defining a central rectangular opening in said rack, said side bars having top surfaces, said rack being dimensioned to receive bee frames and to permit said frames to hang from and be supported by the top surfaces of said side bars; and
   (b) at least one upright inspection support having an upper end and a lower end and comprising at least two substantially parallel upright bars having top surfaces and bottom surfaces, at least one cross bar attached to and joining said upright bars, and at least two notched extensions, affixed to and vertically extending above said upright bars, said upper end of the inspection support having an opeing dimensioned to receive a bee frame and to permit said frame to hang from and be supported by said notched extensions said notched extensions being disposed and dimensioned to engage a bee fram, said upright inspection support being detachably affixed in a substantially perpendicular fashion to said holding rack.

9. A bee frame caddy for extrahive beekeeping operations comprising:

(a) a holding rack having two side bars and two end bars, joined end to end in a open rectangular configuration, defining a central rectangular opening in said rack, said side bars having top surfaces, said rack being dimensioned to receive bee frames and to permit said frames to hang from and be supported by the top surfaces of said side bars;

(b) an upright inspection support having an upper end and a lower end and comprising at least two substantially parallel upright bars having top surfaces and bottom surfaces, at least one cross bar attached to and joining said upright bars and at least two notched extensions, affixed to and vertically extending above said upright bars, said upper end of the inspection support having an opening dimensioned to receive a bee frame and to permit said frame to hang from and be supported by said notched extensions, said notched extensions being disposed and dimensioned to engage a bee frame, the lower end of the inspection support having right angled notches formed along a line extending up from the bottom surfaces of the upright bars, on an axis along the length of said upright bars, and a line extending substantially perpendicular thereto, said right angled notches resulting in narrowed portions of the upright bars, said narrowed portions having a plurality of holes therein extending through the right angled notches; and (c) a plurality of hanger bolts affixed to an end bar of the holding rack, extending in an outward direction from said holding rack on an axis along the length of the side bars, positioned to engage the holes in the narrowed portions of the upright bars, said holes being disposed and dimensioned to telescope said hanger bolts, said upright inspection support being detachably affixed in a substantially perpendicular fashion to said holding rack by means of washers and nuts which are applied to said hanger bolts upon insertion of said bolts through said holes, said right angled notches substantially contacting the holding rack.

* * * * *